Sept. 15, 1942.  H. ROSE  2,296,185
HEATER
Filed Nov. 29, 1939  2 Sheets-Sheet 1

INVENTOR
HARRY ROSE
BY
G. H. Braddock
ATTORNEY

Sept. 15, 1942.　　　　　H. ROSE　　　　　2,296,185

HEATER

Filed Nov. 29, 1939　　　　2 Sheets-Sheet 2

INVENTOR
HARRY ROSE
BY G. H. Braddock
ATTORNEY

Patented Sept. 15, 1942

2,296,185

UNITED STATES PATENT OFFICE 2,296,185

HEATER

Harry Rose, Wyandotte, Mich., assignor to Stewart-Warner Corporation, Chicago, Ill., a corporation of Virginia Application November 29, 1939, Serial No. 306,700

6 Claims. (Cl. 237—17)

The present invention relates to a heater, and has more especial reference to a heating apparatus for warming the interior space of an enclosure, as, for example, the interior space of the cabin of an airplane or a boat, the interior space of the body of an automotive vehicle, or the interior space of any building structure.

An object of the invention is to provide a heating apparatus which will include a fuel burner adapted to the purpose of causing air to be heated, and a novel and improved construction and arrangement for sustaining combustion of fuel in said burner.

A further object is to provide a heating apparatus which will include a fuel burner adapted to the purpose of causing air to be heated, a construction and arrangement for causing air heated by the fuel burner to be circulated throughout an interior space to be warmed, and a novel and improved construction and arrangement for sustaining combustion of fuel in said burner.

A further object is to provide a heating apparatus which will include a fuel burner adapted to the purpose of providing heated fluid medium for air heating purposes of the heating apparatus, a construction and arrangement for causing air heated by said heated fluid medium to be circulated, and a novel and improved construction and arrangement for sustaining combustion of fuel in said burner.

A further object is to provide a heating apparatus which will include a heating unit, a fuel burner adapted to provide heated fluid medium for air heating purposes of said heating unit, a construction and arrangement for causing air heated by said heated fluid medium to be circulated, and a novel and improved construction and arrangement for sustaining combustion in said burner.

A further object is to provide a heating apparatus which will include a fuel burner adapted to the purpose of causing air to be heated, a construction and arrangement including a motor driven blower or fan for causing air heated by said fuel burner to be circulated, and a construction and arrangement including a pump adapted to be propelled by the motor which actuates said blower or fan for causing combustion of fuel in said burner to be sustained.

And a further object is to provide a heating apparatus which will include a fuel burner adapted to the purpose of providing heated fluid medium for air heating purposes of said heating apparatus, a construction and arrangement including a motor driven blower or fan for causing air heated by said heated fluid medium to be circulated, and a construction and arrangement including a pump adapted to be propelled by the motor which actuates said blower or fan for causing combustion of fuel in said burner to be sustained.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Figure 1:
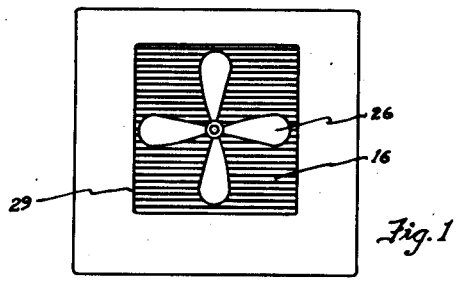
Fig. 1 is a rear elevational view of a heating apparatus made according to the invention.

With respect to Figs. 1 to 5 of the drawings and the numerals of reference thereon, the novel and improved heating apparatus 15 there shown is adapted to be supported upon any member or surface, as, for example, the floor or a side wall of the cabin of an airplane or a boat, the floor or the dash or a side wall of the body of an automotive vehicle, or upon the floor or a side wall of a room of any building structure.

The heating apparatus 15 includes a heating unit 16 and said heating unit includes a fluid-heated, air-heating core consisting of an upper fluid tank 17, a lower fluid tank 18, a plurality of spaced apart fluid conveying tubes, each denoted 19, extending between said tanks 17 and 18, and fins, each indicated 20, in spaced apart relation to each other upon said tubes 19 and extending transversely of the tubes. Said fluid conveying tubes 19 are arranged in two spaced apart banks or sets of tubes. As disclosed, each tube 19 is relatively flat and wide, said tubes desirably being of width slightly less than that of the tanks 17 and 18. As disclosed, said tanks are of substantially equal length and width. Outermost tubes 19 of the different banks or sets of tubes will be arranged in somewhat spaced relation to the opposite end portions of the tanks 17 and 18, and all of the tubes will be arranged in parallel.

Each of the fluid tanks 17 and 18 desirably may consist of a header member 21 into which the adjacent ends of the tubes 19 are suitably fastened in fluid-tight fashion, as by soldering or otherwise, and a closure member 22 suitably fastened, also in fluid-tight fashion, as by soldering or otherwise, to the marginal portions of the corresponding header member 21.

The fins 20 desirably are of relatively small thickness and of width slightly greater than the width of the tubes 19, which tubes may be of equal width. The construction will include longer fins adjacent the upper and lower, or outer, end portions of the core of the heating unit 16 and shorter fins between the two sets of longer fins. The longer fins will be of length a trifle greater than the measurement representing the distance apart of the outermost tubes of the different banks or sets of tubes, and each shorter fin will be arranged upon the tubes 19 of but a single bank or set of tubes. The forward and rearward edges, respectively, of the fins desirably terminate in a single plane, as do also the outer edges, respectively, of said fins. The inner edges of the shorter fins, between the two sets of longer fins, terminate at about the location of the innermost tubes 19, 19 of the different banks or sets of tubes. The innermost fins of the two sets of longer fins are in spaced relation to each other, and thus a rectangular space, represented 23, in the core and between the banks or sets of tubes and surrounded by the longer and shorter fins is provided, for a purpose to be made clear.

The tubes 19 of the different banks or sets of tubes desirably are spaced at equal distance from each other, and each of said tubes desirably is perpendicular to each header member 21, with the widths of the tubes preferably disposed perpendicularly to a plane extending longitudinally and perpendicularly through both header members.

Figure 2:
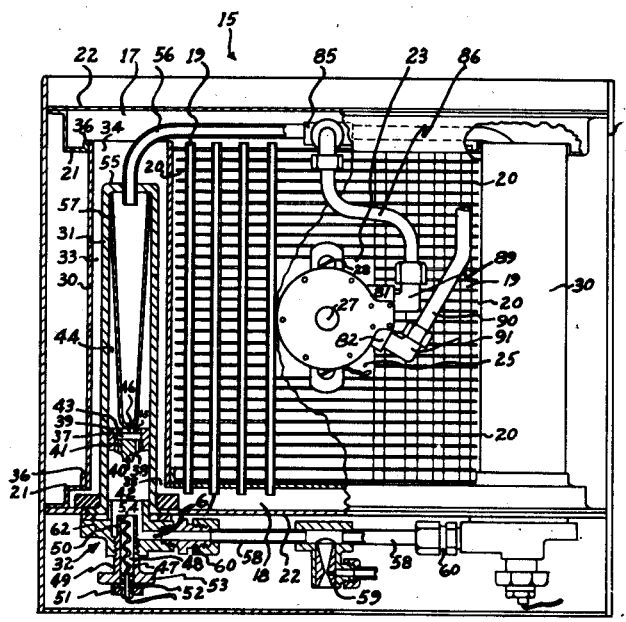
Fig. 2 is an enlarged front elevational view, partially in section and partially broken away, of the heating apparatus of Fig. 1.

The fins 20, including both the longer and shorter fins, desirably are likewise spaced at equal distance from each other, with the outermost, or uppermost and lowermost, fins desirably being spaced at this same distance from the header members 21, as is best disclosed in Fig. 2. Said fins 20 may be associated with the tubes 19, before said tubes are secured to the header members 21, in any suitable and convenient manner. Preferably, the fins are secured to the tubes, as by soldering or otherwise, to be in intimate heat conveying contact with said tubes.

An enclosing and supporting structure 24 for the heating unit 16 is adapted to be assembled with said heating unit in any ordinary or preferred way. As disclosed, both said heating unit 16 and its enclosing and supporting structure 24 are of general rectilinear configuration.

Figure 3:
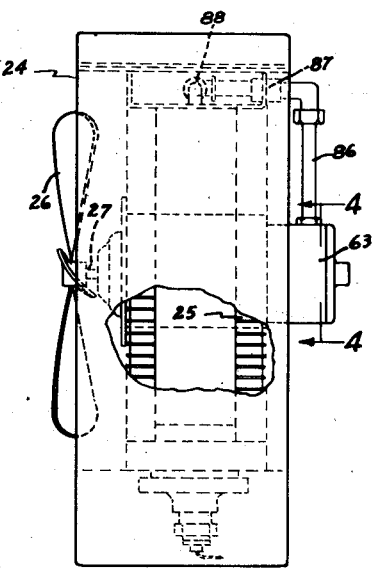
Fig. 3 is a side elevational view, partially in section and partially broken away, of the heating apparatus of Figs. 1 and 2, as said heating apparatus would appear from the left side of Fig. 2.
Figure 5:
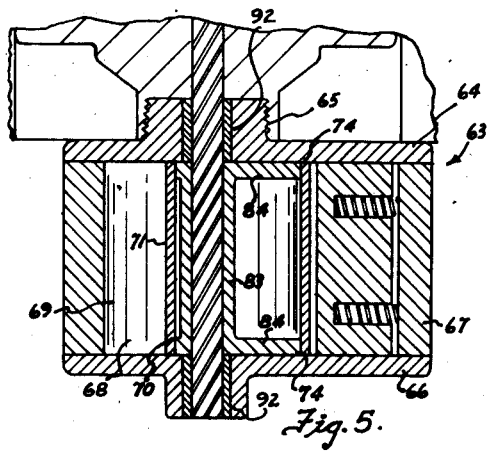
Fig. 5 is a sectional view further detailing the pump of Fig. 4, taken as on line 5—5 in said Fig. 4.
Figure 4:
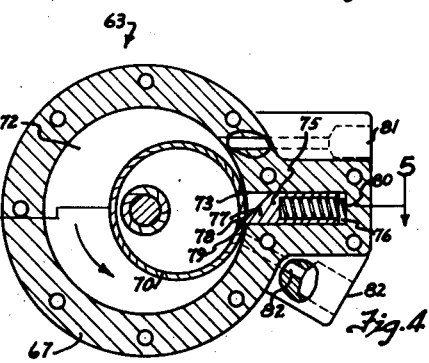
Fig. 4 is an enlarged sectional view detailing the pump of the heating apparatus of Figs. 1 to 3, taken on line 4—4 in Fig. 3.

An electric motor within the space 23 of the heating core of the unit 16 is denoted 25, and said electric motor has a blower or fan 26 fixed upon its shaft 27. The electric motor 25 is of dimensions to nicely fit into the space 23, and the arrangement is such that the blower or fan 26 will be situated adjacent the heating core of the unit 16 in comparatively close relation to said heating core, about as illustrated in Fig. 3. When electric power is applied from a source (not shown), such, for example, as a battery, or a power line, to the electric motor 25, the blower or fan 26 is driven to force air through the heating core, past and over the tubes 19 and the fins 20 thereof. The electric motor can be secured in and to the heating core of the unit 16 in any suitable and convenient manner, as represented at 28.

The forward portion of the enclosing and supporting structure 24 will be open, as will also the rearward portion of said enclosing and supporting structure. As disclosed in Fig. 1, the rearward portion of the structure 24 includes a rectangular opening 29 in alinement with the fins 20 and having area substantially equal to, or a trifle less than, the overall area of the rearward edges of said fins 20, collectively. Of course, the enclosing and supporting structure 24 could include grills or deflectors (not shown) in covering relation to the heating core, and/or a shroud (not shown) for the blower or fan.

The heating apparatus includes two fuel or fluid fuel heating devices which in the disclosure as made are incorporated directly into the heating unit 16. Each of said heating devices includes a boiler consisting of an outer boiler shell 30 and an inner boiler core 31, and each heating device also includes a burner 32 for causing the boiler of the heating device to be heated.

The outer boiler shell 30 and the inner boiler core 31 of each boiler provide a fluid chamber 33 of the boiler between said boiler shell and boiler core. There is a heating device including boiler and burner at each side of the electric motor 25 and blower or fan 26, in adjacent relation to and at the outer sides of the tubes 19 and the fins 20. The upper tank 17 of the heating core of the unit 16 is open to the upper portion of the boiler space or fluid chamber 33 of each boiler, as at 34, and the lower portion of said boiler space or fluid chamber of each boiler is open to the lower tank 18 of said heating core, as at 35. Upper and lower, or opposite, end portions of the outer boiler shell 30 of each boiler are assembled with the upper tank 17 and the lower tank 18 in fluid-tight manner, as represented at 36. The lower end portion of each boiler space or fluid chamber 33 is closed by interengaging walls of the outer boiler shell 30 and the inner boiler core 31, and said outer boiler shell and inner boiler core of each boiler are rigidly assembled together. The boiler space or fluid chamber 33 of each boiler, provided by the outer boiler shell and the inner boiler core, is in surrounding relation to said inner boiler core.

As disclosed, the burner 32 of each heating device includes an igniter case 37 rigidly and tightly seated in the lower open end portion of the corresponding inner boiler core 31. Each igniter case 37 includes a re-igniter 38, desirably of ceramic like material, seated therein against an annular shoulder 39 of said igniter case. Each re-igniter 38 includes a concavity 40 in its lower surface, and apertures 41 extend through the body of each re-igniter. The apertures 41 are in communication at their lower ends with a lower chamber 42 of the corresponding inner boiler core 31, below the re-igniter, and at their upper ends with a small chamber 43 in the igniter case, above said re-igniter. The small chamber 43 of each igniter case, above said lower chamber 42, is open at its upper end to an upper comparatively large chamber 44 of the corresponding inner boiler core 31 by way of a passage 45 in the upper wall 46 of said igniter case. In the instance of each heating device, the lower and upper chambers 42 and 44 and the small chamber 43 constitute the whole of the interior space of the corresponding inner boiler core 31.

The burner 32 of each heating device also includes a resistance element 47 situated in a way 48 directly below the lower chamber 42 provided by a tube 49 supported by a hollow element 50. The lower end of each resistance element 47 is anchored in a conducting element 51 itself insulatively fixed, as at 52, in an enlarged portion 53 of the tube 49 at the lower end of said tube, and the upper end of each resistance element is attached, as at 54, to the tube 49. Each conducting element 51 extends to position below the enlarged portion 53 of the corresponding tube 49, and the lower portion of each tube 49 is closed in fluid-tight manner at the location where the corresponding conducting element is fixed in the tube.

The inner boiler core 31 of each heating device includes an upper closure wall 55 in spaced relation to the upper fluid tank 17, and an outlet pipe 56 extends centrally and upwardly from each upper closure wall 55. Each outlet pipe 56 constitutes an exhaust passageway leading from its corresponding burner.

A generally V-shape baffle 57 is suitably and conveniently situated within the upper chamber 44 of each inner boiler core 31 with its base situated above and adjacent to the corresponding passage 45 and its divergent upwardly extending legs situated at either side of the corresponding outlet pipe 56. The outer portion or surfaces of each V-shape baffle 57 are in spaced relation to the side wall of the corresponding inner boiler core 31, as are also the opposite side edges of said V-shape baffle, and the ends of the legs of each V-shape baffle, spaced from the base thereof, terminate in proximity to the corresponding upper closure wall 55.

Each hollow element 50 is suitably and conveniently fastened up against its corresponding inner boiler core 31 to cause the lower end of the lower chamber 42 of said boiler core effectively to be closed, and an inlet pipe 58 leading to each lower chamber 42 is adapted to extend from a carburetor 59 for causing fluid fuel, such as gasoline mixed with air, to be fed into said lower chamber 42 in response to vacuum or suction created in or at the corresponding outlet pipe 56. In the disclosure as made, a single carburetor 59 supplies both inlet pipes 58, and said inlet pipes lead in opposite directions from said carburetor, each inlet pipe 58 extending from the carburetor to its own heating device. Each inlet pipe 58 is suitably and conveniently secured in fluid-tight manner, as at 60, to the corresponding hollow element 50, and a passage through each inlet pipe communicates with a passage 61 in said corresponding hollow element which leads to an annular space 62 within the hollow element surrounding the upper portion of the corresponding tube 49 and contiguous with the lower end of the lower chamber 42. The annular space 62, the lower chamber 42, the small chamber 43 and the upper chamber 44 may be termed the combustion chamber of the burner of each heating device.

Each resistance element 47 is adapted to be energized by electric current from any suitable and convenient source (not shown). A circuit for each resistance element could include a thermostatically actuated circuit controller which would be operable to cause said circuit normally to be closed but to be open when the burner is sufficiently hot to cause the re-igniter itself to support combustion, as will be understood. Both of the resistance elements 47 can be connected in a single circuit including a hand switch for making and breaking said circuit.

Assuming suction or vacuum, or pressure below atmospheric pressure, to exist in both outlet pipes 56, and both resistance elements 47 to be energized, liquid fuel, say, for example, gasoline, mixed with air will be drawn or pulled or fed from the carburetor 59 through the inlet pipes 58 into the combustion chamber of each heating device. The combustible fuel mixture of course will be ignited in the combustion chamber of each heating device by the corresponding resistance element 47 and caused to burn in the combustion chambers of both heating devices. The products of combustion, or hot gases, in passing through the interior spaces of the inner boiler cores 31, about the V-shape baffles 57, will cause fluid medium in each boiler space or fluid chamber 33 to be heated. The products of combustion when spent will pass into the outlet pipes 56. Evidently, hot fluid medium heated in the boiler spaces or fluid chambers 33 will rise to the tops or upper portions of said boiler spaces or fluid chambers and enter the upper fluid tank 17. Upon entering said upper fluid tank the hot fluid medium will flow or be forced downwardly through the fluid conveying tubes 19 of the heating core of the unit 16 and give up heat to said tubes and the fins 20 thereon. If the hot fluid medium is steam, or gaseous, it will be condensed in the heating core. The hot fluid medium will pass downwardly by gravity through the heating core of the unit 16 and enter the lower fluid tank 18. The fluid medium to be heated in the boiler spaces or fluid chambers 33 of the different heating devices of course continuously is supplied from said lower fluid tank 18 and enters said boiler spaces or fluid chambers at the locations 35 where the boiler spaces or fluid chambers are in open communication with the lower fluid tank.

While traveling through the fluid conveying tubes 19, the heated fluid medium gives off heat which is absorbed by the fins 20, and, by rotation of the blower or fan 26, air is caused to be heated and distributed about in a space to be warmed. Assuming a switch, or switches, of a circuit, or circuits, including the resistance elements 47 and the electric motor 25 to be closed, so that said resistance elements and said electric motor are energized and the blower or fan 26 is put into operation, with vacuum or suction, or pressure below atmospheric pressure, existing in the outlet pipes 56, considerable heat is produced in the space surrounding the heating apparatus in a comparatively few seconds.

Vacuum or suction, or pressure below atmospheric pressure is produced in each of the outlet pipes or exhaust passageways 56 by a pump, represented generally at 63, and said pump is actuated by the electric motor 25. More explicitly, the pump 63 is driven through the instrumentality of the motor shaft 27.

Said pump 63 is of rotary type. As illustrated, it includes a casing consisting of an inner closure member 64 rigid, as at 65, with the electric motor 25, an outer closure member 66, and an intermediate body member 67 rigid with said inner and outer closure members. Said intermediate body member is hollowed out or cut away to provide a pump chamber 68 defined or bounded as to its circumference by an internal cylindrical wall 69 which said body member 67 provides, and defined or bounded as to its depth by the adjacent flat surfaces of the inner closure member 64 and the outer closure member 66. The outer surface of said inner closure member 64 and the inner surface of said outer closure member 66 lie contiguous with the inner and outer ends, respectively, of said internal cylindrical wall 69.

A hollow cylindrical impeller 70 is eccentrically situated within the pump chamber 68 with its external cylindrical wall 71 in engagement with the internal cylindrical wall 69 of said pump chamber. The external cylindrical wall of the hollow impeller has diameter less than that of the internal cylindrical wall of the pump chamber, and said hollow impeller and said pump chamber together provide a crescent shape cavity 72 at the side of the impeller and pump chamber opposite the point or location 73 of engagement between the external cylindrical wall 71 of said impeller and the internal cylindrical wall 69 of said pump chamber. The hollow cylindrical impeller 70 has length, or dimension in direction axially thereof, equal to the depth of the pump chamber 68, and the opposite ends or edges 74 of said hollow impeller are flat, are parallel with each other, and lie in contiguous, fluid-tight, slidable relation to the end walls of said pump chamber. The crescent shape cavity 72 has depth equal to the length of the hollow impeller, as well as equal to the depth of the pump chamber.

An abutment 75 is associated with the hollow impeller 70 and with the intermediate body member 67 of the pump casing to the purpose of shutting-off or separating the high pressure side of the pump from the low pressure side of said pump. Said abutment 75 is constituted as a rectilinear member of rigid material slidably mounted in a rectilinear concavity 76 in said body member 67 and disposed radially of the pump chamber 68. The inner side portion 77 of the abutment 75 is of reduced width, and the inner, comparatively narrow side edge 78 of said abutment is situated in a longitudinally disposed slot or groove 79 provided in the external cylindrical wall 71 of the hollow impeller 70 and extending from end to end of said hollow impeller. The abutment 75 is freely slidable in the concavity 76, and one or more coil springs 80, within a pocket of said abutment and between the abutment and the base of the concavity 76, constantly urge the inner side 78 of the abutment into engaging relation with the base of the slot or groove 79, regardless of the position of the hollow impeller 70 within the pump chamber 68. The abutment 75 has length equal to the length of the body member 67, as well as to the depth of the pump chamber 68, and the opposite ends of said abutment terminate flush with the opposite ends of said body member 67 and hollow impeller 70. The abutment 75 is disposed radially of the pump chamber in the direction of the width of said abutment, and is disposed perpendicularly to the body member 67 and the hollow impeller 70, as well as parallel to the axes of said body member and said hollow impeller, in the direction of the length of said abutment.

The abutment 75 is between an inlet 81 to the pump chamber 68 at the low pressure side of the pump and an outlet 82 from said chamber at the high pressure side of said pump. Said inlet 81 and outlet 82, especially said outlet, desirably are relatively close to said abutment.

The pump includes means for causing the external cylindrical wall 71 of the hollow impeller 70 to be rolled, slid or frictionally moved progressively over the internal cylindrical wall 69 of the pump chamber 68. The motor shaft 27 fixedly carries a crank or eccentric 83 adapted to the purpose of accomplishing rotative movement of the axis for the impeller 70 and its external cylindrical surface 71. More explicitly, the crank or eccentric 83 includes spaced apart, circular end walls 84 thereof rotatively mounted within said hollow cylindrical impeller 70, and said circular end walls 84 are eccentrically fixed upon said motor shaft 27. As shown, the end walls 84, respectively, are in slidable engaging relation to the adjacent surfaces of the closure members 64 and 66 of the pump casing. The motor shaft 27 passes centrally through the pump chamber 68 and is suitably and conveniently rotatably mounted, as at 92, in said closure members 64 and 66. The circumferences or peripheries of the circular end walls 84, 84 are in alinement with each other in direction axially of the motor shaft 27. Rotation of the motor shaft causes the crank or eccentric 83 and its spaced apart, eccentrically supported, circular end walls 84, 84 to revolve within the hollow impeller 70 thus to accomplish rotative movement, or movement in a circle, of the axis for said hollow impeller and its external cylindrical wall 71 in the direction of the arrow in Fig. 4. Such movement of the axis for said hollow impeller causes the impeller to be moved in direction toward and away from the abutment 75, so that said abutment moves inwardly and outwardly, under urging of the coil spring, or coil springs, 80, of the pump chamber 68 with rotative movement of the axis for said hollow impeller. The arrangement is such that the abutment is never removed from the longitudinal slot or groove in the hollow impeller 70, and the construction is such that said hollow impeller rocks with respect to said abutment. The arrangement is also such that the abutment is never entirely removed from the concavity 76. Rotative movement of the axis for the hollow impeller 70 also causes the external cylindrical wall 71 of said hollow impeller to be rolled, slid or frictionally moved or advanced over the internal cylindrical wall 69 of the pump chamber 68, thus to accomplish the pumping operation. As the pump operates, the crescent shape cavity decreases in size as it is moved in direction from the low pressure side toward the high pressure side of the abutment 75, and increases in size as it is moved from the high pressure side toward the low pressure side of said abutment. During each revolution of the axis for the hollow impeller, vacuum or suction is created in the crescent shape cavity at the low pressure side of the pump, as well as in the inlet 81 to said pump, due to increasing space of the low pressure area or section of said crescent shape cavity, to cause fluid to be removed from said inlet 81 and enter the crescent shape cavity, and pressure is created in said crescent shape cavity at the high pressure side of the pump, as well as in the outlet 82 from said pump, due to decreasing space of the high pressure area or section of the crescent shape cavity, to cause fluid to be compressed out of said crescent shape cavity and delivered to said outlet 82.

Each outlet pipe or exhaust passageway 56, leading from the interior space of each inner boiler core 31 through its upper closure wall 55, extends first vertically upwardly into the upper fluid tank 17 and then horizontally along the interior of said upper fluid tank inwardly thereof. A fitting 85 substantially at the midlength of the upper fluid tank 17 connects the different outlet pipes 56 with each other, and a pipe connection 86 leads from said fitting 85 to the pump inlet 81. Said pipe connection 86 extends in fluid-tight fashion, as at 87, through a side wall of the upper fluid tank 17. One end of the pipe connection 86 is secured, as at 88, to said fitting 85, and the other end of said pipe connection is secured, as at 89, to said pump inlet 81. An exhaust manifold 90 which leads from the pump outlet 82 is secured to said pump outlet as at 91.

It will be obvious that a draft of magnitude sufficiently great effectively to sustain combustion in the burners of the heating devices can be created and maintained in the combustion chambers of said burners by actuation of the pump 63. Evidently, the course of the spent products of combustion from said combustion chambers will be through the outlet pipes 56, the pipe connection 86, the pump inlet 81, the pump chamber 68, the pump outlet 82, and the exhaust manifold 90, to atmosphere. Heat created at the burners will be given up to the fluid medium employed for heating purposes in the manner as hereinbefore set forth, and, too, products of combustion as these pass outwardly through the outlet pipes 56 will give up heat both to fluid medium in the upper portions of the boilers and to fluid medium in the upper fluid tank 17. In turn, the fluid medium will have tendency toward reducing the temperature of the spent gases in said outlet pipes 56.

The heating apparatus disclosed in Figs. 6 to 10 of the drawings is in many respects similar to the heating apparatus of Figs. 1 to 5 hereinbefore fully described, and parts in said Figs. 6 to 10 which are the same as equivalent parts in said Figs. 1 to 5 bear similar reference numerals.

More explicitly, the structures of Figs. 1 to 5 and of Figs. 6 to 10 may be substantially duplicates, with the exception that pressure above atmospheric pressure, instead of pressure below atmospheric pressure, for sustaining combustion in the burners of the different heating devices is produced by the pump 63 of said Figs. 6 to 10. The inlet 81 to the pump of Figs. 6 to 10 leads to the low pressure side of said pump directly from atmosphere, and a pipe connection 100 leads from the pump outlet 82 at the high pressure side of said pump of Figs. 6 to 10 to a carburetor 101 for supplying each inlet pipe 58 with combustible fuel mixture. Said carburetor 101 is in communicating relation with a fitting 102 between and connecting said inlet pipes 58 to each other. The joints between said pipe connection 100 and said carburetor 101, and between the carburetor and the fitting 102, as well as between said fitting and the inlet pipes 58, are of course fluid-tight. An exhaust manifold 103 leads from the fitting 85.

It will be obvious that a draft of magnitude sufficiently great effectively to sustain combustion in the burners of the heating devices of Figs. 6 to 10 can be created and maintained in the combustion chambers of said burners by actuation of the pump 63 of said Figs. 6 to 10. Pressure created in the pipe connection 100 leading from the outlet 82 of said mentioned pump will cause flow of atmospheric air, which enters the pump through its inlet 81, past the carburetor 101 into the inlet pipes 58 and thence into the combustion chambers of the burners, and the air, under pressure greater than atmospheric pressure, which passes said carburetor will induce or cause a flow of liquid fuel, say, for example, gasoline, to enter said carburetor and said inlet pipes 58 by way of a liquid fuel line 104 suitably assembled with the carburetor 101. That is, gaseous fuel mixture will be forced into and through the combustion chambers of the burners of the heating devices of Figs. 6 to 10 in response to pressure created by the pump 63 of said Figs. 6 to 10, and spent products of combustion will pass outwardly under pressure, greater than atmospheric pressure, from said combustion chambers, through the outlet pipes 56 and the exhaust manifold 103, to atmosphere.

An obvious advantage of the construction and arrangement for sustaining combustion in the burners of the heating devices disclosed in Figs. 6 to 10 is that atmospheric air passes through the pump 63 of said Figs. 6 to 10. The air, after passage through said pump, becomes mixed with liquid fuel, or gasoline, supplied at the carburetor, and the resultant combustible mixture is fed under pressure of the air into the combustion chambers to be burned. Spent gases are forced to travel from the combustion chambers to atmosphere.

Figure 6:
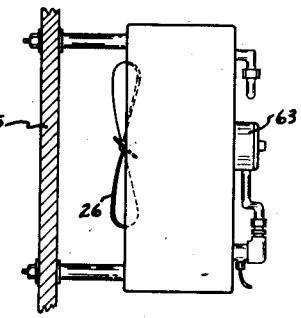
Fig. 6 is a side elevational view of a heating apparatus of modified construction made according to the invention.
Figure 7:
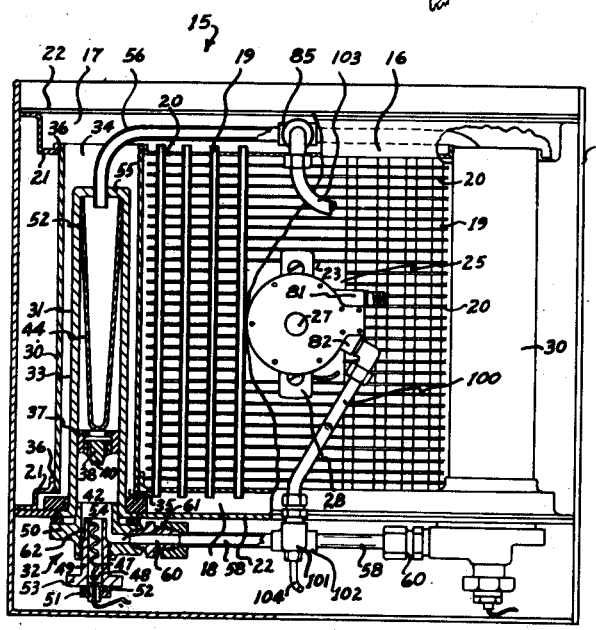
Fig. 7 is an enlarged front elevational view, partially in section and partially broken away, of the heating apparatus of Fig. 6.
Figure 8:
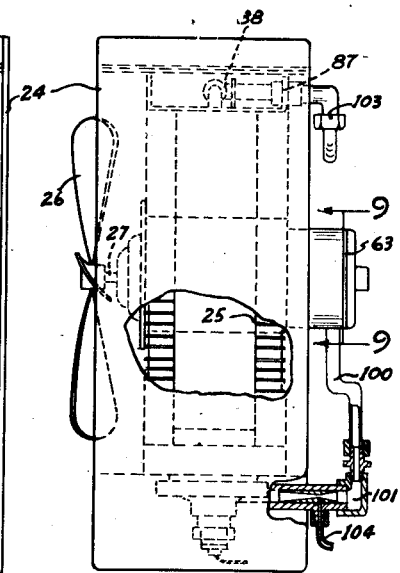
Fig. 8 is a side elevational view, partially in section and partially broken away, of the heating apparatus of Figs. 6 and 7.
Figure 10:
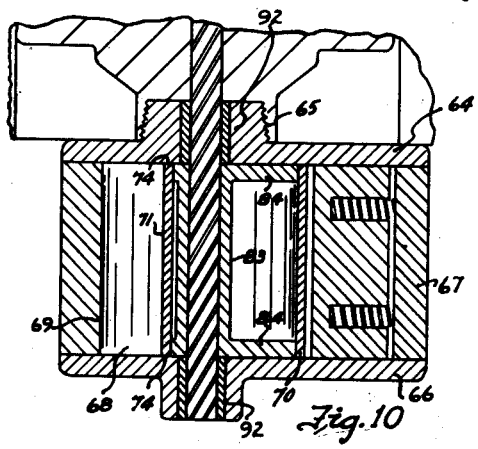
Fig. 10 is a sectional view further detailing the pump of Fig. 9, taken as on line 10—10 in said Fig. 9.
Figure 9:
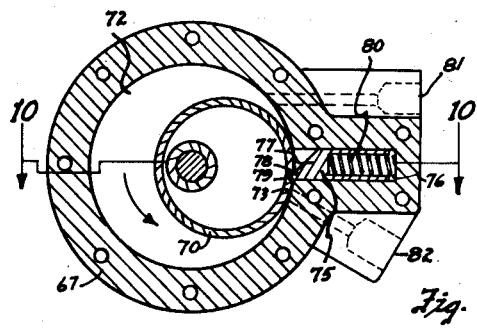
Fig. 9 is an enlarged sectional view detailing the pump of the heating apparatus of Figs. 6 to 8, taken on line 9—9 in Fig. 8.

The heating apparatus of Figs. 6 to 10 is disclosed in Fig. 6 as when supported upon the dash 105 of an automotive vehicle, or upon some other wall of an enclosure. It is to be understood, however, that either form of heating apparatus herein presented can be employed to heat any space or enclosed space, or to provide heat for any purpose, and either heating apparatus can be supported in any manner which is suitable and convenient.

In any installation of either heating apparatus, the heating apparatus can be placed in operation merely by energization of the electric motor 25 and the resistance elements 47, and will be made to cease operation by de-energization of said electric motor. Desirably, the resistance elements should be de-energized when the heating apparatus is put out of operation.

What is claimed is:

1. A heating apparatus comprising a fluid-heated, air-heating core including an upper fluid tank, a lower fluid tank and fluid conveying tubes extending between said upper and lower fluid tanks, a fuel burner at each side of said fluid conveying tubes, each of said fuel burners including a combustion chamber for receiving combustible fuel to be burned, an upright boiler in surrounding relation to each combustion chamber, upper and lower portions of each of said boilers being open to said upper and lower tanks, respectively, a motor, a blower adapted to be driven by said motor to cause air to be passed through said core, and means including a pump adapted to be driven by said motor and cooperating with said burners to cause combustible fuel to be fed into each of said combustion chambers and a draft through each combustion chamber to be sustained, said means including an outlet from each combustion chamber and a conduit leading from each outlet through said upper fluid tank to said pump.

2. A heating apparatus comprising a fluid-heated, air-heating core including an upper fluid tank, a lower fluid tank, and fluid conveying tubes extending between said upper and lower fluid tanks, a fuel burner including a combustion chamber for receiving combustible fuel to be burned, a boiler in surrounding relation to said combustion chamber with upper and lower portions of said boiler open to said upper and lower fluid tanks, respectively, a motor, a blower driven by said motor to pass air through said core, means for maintaining a flow of combustible fuel into said combustion chamber and for exhausting burned gases therefrom, and an exhaust pipe connected to said burner and passing through one of said tanks whereby heat contained in gases exhausted from said burner is transferred to fluid in said tank.

3. A heating apparatus comprising a fluid-heated, air-heating core including an upper fluid tank, a lower fluid tank and fluid conveying tubes extending between said upper and lower fluid tanks, a fuel burner at each side of said fluid tank, each of said fuel burners including a combustion chamber for receiving combustible fuel to be burned, an upright boiler in surrounding relation to the combustion chamber, upper and lower portions of each of said boilers being opened to said upper and lower fluid tanks, respectively, a blower for circulating air over said core, a common carburetor for said burners, and common means for maintaining the flow of combustible mixture from said carburetor through said burners.

4. A heating apparatus comprising a fluid-heated, air-heating core and including spaced apart fluid tanks and fluid conveying tubes extending between said spaced apart fluid tanks, a fuel burner including a combustion chamber for receiving combustible fuel to be burned, a boiler in surrounding relation to said combustion chamber and having its opposite end portions open to said spaced apart fluid tanks, a motor, a blower driven by said motor to pass air over said core, means including a pump cooperating with said burner for causing combustible fuel to be fed into and spent gases to be removed from said combustion chamber, and an exhaust pipe for said combustion chamber extending into one of said tanks whereby heat contained in these spent gases is transferred to fluid in said last named tank.

5. A heating apparatus comprising a fluid-heated, air-heating core including spaced apart fluid tanks and fluid conveying tubes extending between said spaced apart fluid tanks, a plurality of fuel burners, each of said fuel burners including a combustion chamber for receiving combustible fuel to be burned, a boiler in heat transmitting relation to each combustion chamber, means providing fluid communication between said boilers and said fluid tanks, means for circulating air over said core, a common carburetor for supplying combustible fuel to said burners, and common means for causing combustible fuel to be fed into and spent gases to be removed from said combustion chambers.

6. A heating apparatus comprising a fluid-heated, air-heating core including spaced apart fluid tanks and fluid conveying tubes extending between said spaced apart fluid tanks, a plurality of fuel burners, each of said fuel burners including a combustion chamber for receiving combustible fuel to be burned, a boiler in heat transmitting relation to each combustion chamber, means providing fluid communication between said boilers and said fluid tanks, means for circulating air over said core, means for causing combustible fuel to be fed into and spent gases to be removed from said combustion chambers, and exhaust pipes for said combustion chambers extending into said fluid tanks whereby heat contained in spent gases exhausted from said combustion chambers is transferred to fluid in said tanks.

HARRY ROSE.